US008869198B2

(12) United States Patent
Riveiro Insua et al.

(10) Patent No.: US 8,869,198 B2
(45) Date of Patent: Oct. 21, 2014

(54) PRODUCING VIDEO BITS FOR SPACE TIME VIDEO SUMMARY

(75) Inventors: Juan Carlos Riveiro Insua, Barcelona (ES); Nils Hakan Fouren, Barcelona (ES); Francisco Jose Blasco Abril, Valencia (ES); Nicolas Francisco Amezquita Gomez, Barcelona (ES)

(73) Assignee: Vilynx, Inc., Palo Alto, CA (US)

( * ) Notice: Subject to any disclaimer, the term of this patent is extended or adjusted under 35 U.S.C. 154(b) by 201 days.

(21) Appl. No.: 13/247,771

(22) Filed: Sep. 28, 2011

(65) Prior Publication Data

US 2013/0081082 A1    Mar. 28, 2013

(51) Int. Cl.
| | | |
|---|---|---|
| H04N 5/445 | (2011.01) | |
| H04N 21/475 | (2011.01) | |
| H04N 21/431 | (2011.01) | |
| H04N 21/4545 | (2011.01) | |
| H04N 21/234 | (2011.01) | |
| H04N 21/8549 | (2011.01) | |
| H04N 21/81 | (2011.01) | |
| H04N 21/84 | (2011.01) | |
| H04N 21/44 | (2011.01) | |
| H04N 21/2343 | (2011.01) | |
| H04N 21/472 | (2011.01) | |
| H04N 21/414 | (2011.01) | |
| G06K 9/00 | (2006.01) | |
| H04N 21/231 | (2011.01) | |

(52) U.S. Cl.
CPC ........ G06K 9/00744 (2013.01); H04N 21/4756 (2013.01); H04N 21/431 (2013.01); H04N 21/45455 (2013.01); H04N 21/23412 (2013.01); H04N 21/8549 (2013.01); H04N 21/8153 (2013.01); H04N 21/84 (2013.01); *H04N 21/44012* (2013.01); *H04N 21/234318* (2013.01); *H04N 21/47205* (2013.01); *H04N 21/41407* (2013.01); *H04N 21/44008* (2013.01); *H04N 21/8146* (2013.01); *H04N 21/23109* (2013.01); *H04N 21/4312* (2013.01)
USPC .............................. 725/37; 725/43; 382/190

(58) Field of Classification Search
USPC ...................................... 725/37, 43
See application file for complete search history.

(56) References Cited

U.S. PATENT DOCUMENTS

| | | | |
|---|---|---|---|
| 7,203,380 B2* | 4/2007 | Chiu et al. .................... | 382/284 |
| 2009/0136141 A1* | 5/2009 | Badawy et al. ............... | 382/225 |
| 2009/0210899 A1* | 8/2009 | Lawrence-Apfelbaum et al. ............................... | 725/34 |
| 2010/0289959 A1* | 11/2010 | Fonseca et al. ............... | 348/564 |
| 2012/0123780 A1* | 5/2012 | Gao et al. ...................... | 704/245 |

\* cited by examiner

Primary Examiner — Brian T Pendleton
Assistant Examiner — Olugbenga Idowu
(74) Attorney, Agent, or Firm — SV Patent Service

(57) ABSTRACT

A computer-assisted method for producing a space time summary for one or more original videos includes automatically recognizing a key element in an original video, extracting pixels related to the key element from a series of video frames of the original video, producing a video bit comprising a series of video frames comprising the pixels and audio information extracted from the original video, wherein at least one video frame of the video bit is formed by a subset of pixels of the corresponding video frame in the original video, automatically displaying a plurality of video bits in a user interface, wherein the plurality of video bits are extracted from one or more original videos, and provide a space time summary for the one or more original videos, and allowing two of the plurality of video bits to be played simultaneously with audio and motion in the user interface.

34 Claims, 9 Drawing Sheets

PRODUCING VIDEO BITS FOR SPACE TIME VIDEO SUMMARY

BACKGROUND OF THE INVENTION

The present disclosure relates to technologies for browsing, indexing, sharing, summarizing, and searching videos.

In recent years, two major technology advancements have created an important trend in everyday life: digital video applications technologies have become increasingly popular; the Internet has enabled people to be increasingly connected. Mobile technologies have improved from making simple phone calls to smart phones and tablets that are powerful computer devices equipped with high definition cameras and connected in 4G wireless networks. Many people now have two cameras in the front and back of their mobile devices always ready to video record of everything happening in their lives. People are willing to share the videos with their friends or the whole world. Digital video signals can now be streamed to mobile devices and computers over the Internet, and to Digital TV at homes. People also want to review old videos to find something or a place or someone that they met. The amount of video recording per user has increased from once a month or a week to several times per day, especially more during holidays, vacations, and other special events. The task of tagging all the videos has become a real challenge to many users. In the near future, people want to use videos as they have been text and images.

A challenge in digital video applications today is a lack of video tools for managing videos in the same flexible way as we manage web and text content. Today video searching is conducted based on tag (metadata) that users associated to videos. The searches are manual and are text based, which requires time and effort from the user.

Moreover, user text tagging is always under the criteria of the user, which can change over time for the same user, and are usually different from the criteria of the user's family and friends with whom the user's videos are to be shared. Thus searching the even tagged videos can become a difficult task for the same user over time and for different users.

It is very difficult and time consuming to use current technologies to browse, organize, share, and search the long video files stored in smart phones, tablets, and computers.

Some products have made initial attempt to address this problem by recognizing faces of people in the video and tag them as metadata. The tags can be used to search people in videos. But these products have limited applications because not all events involve people or human faces and even a person is recognized, more detailed classifications are often needed to recognize the nature of the events.

Some approaches select a few frames that are called "key frames" which are a set of pictures or slides that capture key moments in a video. This "key frames" can significantly reduce file size from a video to a set of pictures, but it pays a heavy price because movement and audio, the essential properties of a video, are lost in the process.

There is therefore still a need to provide simple and effective tools for people to browse, index, share, and search videos in a similar fashion as people manage text and web content.

SUMMARY OF THE INVENTION

In one general aspect, the present invention relates to a computer-assisted method for producing a space time summary for one or more original videos. The method includes automatically recognizing a key element in an original video by a computer processor; extracting pixels related to the key element from a series of video frames of the original video; producing a video bit comprising a series of video frames comprising the pixels and audio information extracted from the original video, wherein at least one video frame of the video bit is formed by a subset of pixels of the corresponding video frame in the original video; automatically displaying a plurality of video bits in a user interface, wherein the plurality of video bits are extracted from one or more original videos, and provide a space time summary for the one or more original videos; and allowing at least two of the plurality of video bits to be played simultaneously with audio and in motion in the user interface.

In another general aspect, the present invention relates to a computer-assisted method for producing a space time summary for an original videos. The method includes automatically recognizing a key element in an original video by a computer processor; extracting pixels related to the key element from a series of video frames of the original video; producing a video bit comprising a series of video frames comprising the pixels and audio information extracted from the original video, wherein the video frames of the video bit follow the key element and dynamically change positions in the video frames of the original video, wherein at least one video frame of the video bit is formed by a subset of pixels of the corresponding video frame in the original video; and allowing the video bit to be played at a user interface with audio and motion to provide a space time summary for the original video.

In another general aspect, the present invention relates to a computer-assisted method for producing a space time summary for one or more original videos. The method includes extracting pixels related to a key element from a series of video frames of one of the original video(s) by a computer processor; producing a plurality of video bits each comprising a series of video frames comprising the pixels and audio information extracted from the one of the original video(s), wherein at least one video frame in one of the plurality of video bits is formed by a subset of pixels of the corresponding video frame in the original video; and allowing at least two of the plurality of video bits to be played simultaneously with audio and motion in a user interface, wherein the two video bits simultaneously played have an overlapping location, wherein the plurality of video bits provide a space time summary for the one or more original videos.

In another general aspect, the present invention relates to a computer-assisted method for producing a space time summary for one or more original videos. The method includes storing feature vectors each associated with a person, an object, an occasion, an event, an action, or a location in a database; selecting the at least two elements from an original video. extracting feature vectors of the at least two elements from the original video by a computer processor; matching feature vectors extracted from the original video to feature vectors stored in the database, wherein the feature vectors in the database are associated with a same feature descriptor; if a positive matching is obtained, automatically recognizing a key element based the feature descriptor associated with the feature vectors stored in the database;

Implementations of the system may include one or more of the following features. The video frames of the video bit can follow the key element and dynamically change positions in the video frames of the original video. At least two video frames in the video bit can have different shapes. At least two video frames in the video bit have different numbers of pixels. At least one video frame in the video bit can have an irregular frame shape other than a rectangle. The video bit can have the same image resolution as the original video. Two video bits in the user interface can overlap in time or overlap in locations in the video frames of the original video. The two video bits played simultaneously in the user interface can have an overlapping location, wherein the pixels of the two video bits in the overlapping location are transparent to each other. The two video bits played simultaneously in the user interface can have an overlapping location, wherein at least some of the pixels of the two video bits in the overlapping location are semi-transparent or opaque to each other. The key element can include a person, an occasion, an event, an action, or a location. The step of automatically recognizing a key element in an original video can include: receiving a search; and automatically detecting the key element in one or more original videos in response to the search. The one or more original videos summarized by the plurality of video bits in the user interface can be recorded by two or more users. The computer-assisted method can further include storing weights in association with the plurality of video bits; and allowing one of the video bits to be zoomed in the user interface according to the weight of the one of the video bits. The weights for the plurality of video bits can be determined by a user. The weights for the plurality of video bits can be determined automatically based on the types of key elements or the frequency of appearance of the key elements in the original video. The weights for the plurality of video bits can be determined by people's relationship in the key elements in the plurality of video bits. The computer-assisted method can further include: receiving a remark from a user about at least one of the video bits in the user interface; and storing the remark in association with the one of the video bits. The remark can determine the importance and the weight of the one of the video bits. The computer-assisted method can further include: allowing one of the video bits to be played by itself in the user interface. The two video bits can be played simultaneously in a same window in the user interface.

Various implementations of the methods and devices described herein may include one or more of the following advantages. The disclosed system and methods provide simple and effective tools for people to browse, index, share, and search videos in a similar fashion as people manage text and web content.

The disclosed system and methods provide a summary of a video with short video bits of the key moments with full audio and motion features, the summary includes space and time which is a significant improvement over some conventional video summary techniques which present static pictures of "key frames" of a vide in a slide show only focus on time summary. The short video bits can provide viewers highlights of important location, people, objects or events in a video, removing the space and time video parts that are not providing any significant value and allow viewers to easily browser and index videos, thus significantly saving time. The efficiency of the summary is very high without losing relevant video and audio parts versus the prior art because there is the saving of the irrelevant info in time as all prior art but also space.

Moreover, the key elements in the original video are automatically recognized by complex, intelligent, space and time scene segmentation and recognition using prior knowledge stored in a database, complex learning process, metadata, statistical information, Markov chain models or using users' input. A series of video frames for the key element can be automatically separated from the original video.

Furthermore, a portion in time and space of a video frame in the original video that contains objects of interests can be extracted to form new video frames. The new video frames can have irregular shapes other than the conventional rectangular frame shape, thus changing shape, size and location over time. The new video frames in the short videos can follow the objects of interest, while both frame shape and size can be changed following the movement of the object of interest. Thus the short videos in the video summary allows viewer to focus their views on the objects of interests without seeing the unimportant objects in the background.

Additionally, different objects, people, events or actions can carry different weights with higher weight indicating more relevance to the topics of the video. The most relevant object is protected from overlapping with other short videos. Some level of transparency is allowed in the areas of video frames with low weight.

The disclosed system and methods provide user interfaces that can simultaneously play multiple short videos from a same original video, or different original videos, from the same user or different users, which can further reduce viewers' time in browsing a large number of short videos from summaries of different original videos.

Another advantage of the disclosed system and methods is that the short video bits in the video summary can have the same image resolution as the original video while preserving full motion and audio features of the original video. Thus the invention system can provide video summaries with higher image quality with greater satisfaction to the viewers. The disclosed system also allows user to view zoomed view frame in some short videos.

The disclosed system and methods can be implemented with distributed or centralized systems and services. In one implementation, videos can be stored in cloud storage. Short videos for summaries of the videos can be automatically generated for the stored videos by centralized processors. The short videos can be viewed and shared by viewers over wired or wireless network using dedicated or standard video players. The reduced data amount in the video summaries, due to the space and time relevant info optimization process declared within this invention, can significantly decrease data transfer times in communication channels.

The present system and methods disclose an important learning process to reduce the input from the user to be able to enable automatic recognition of key elements in videos without user input. This learning process is a key to increase the reliability of the complex video recognition process. As the number of personal videos in the database increases, it is more likely to find the key elements in the video without user help. The learning process includes the collection of information from social networks and any other online source on top of the user input. As an example, people can be recognized based on their bodies and clothes when people' face are not in focus or not facing to the camera. Furthermore, background, objects, actions, and events can also be used to recognize people in videos. Previous videos, metadata (geo-location tag, timestamp, user ID, social data) and online/internet information can be used to understand the events in a new video.

Furthermore, the disclosed system and methods allows viewers to input comments and indicate significance of short video bits in the video summary. The short video bits can be associated with weights representing their respective significance in the original video. Viewers' inputs can be shared and used as index for the videos by other users.

The disclosed system produces short video bits to create summaries of one or multiple videos recorded by one user or different users. The disclosed system provides a new model to share and communicate videos. In one application, a video sharing system, people can share their individual short video bits or short video bits created by other users in response to a particular question, action or objective. The optimization on space and time of the video makes the model possible. Irrelevant video portions are not shared.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles, devices and methods described herein.

DETAILED DESCRIPTION OF THE INVENTION

Figure 1:
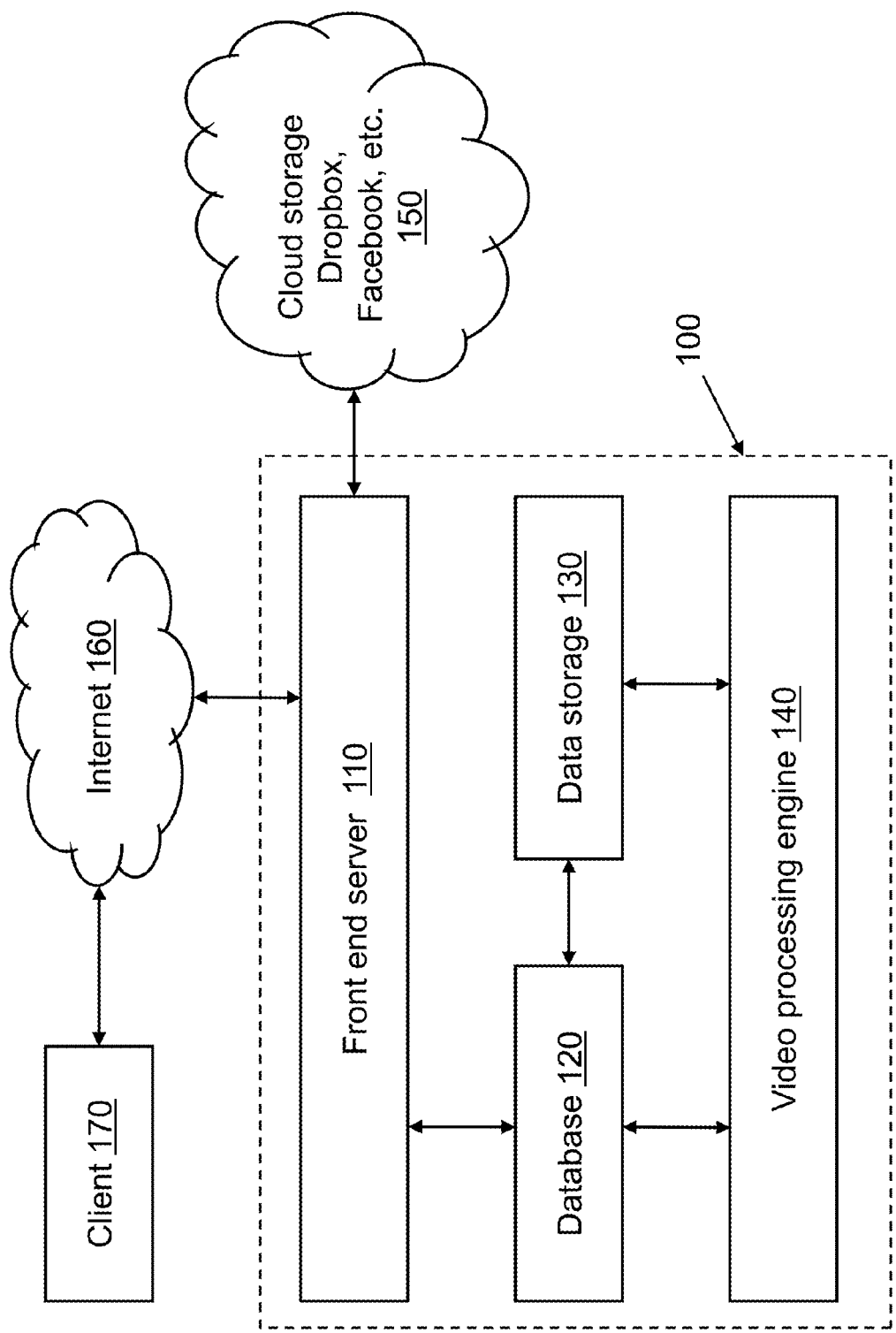
FIG. 1 is a schematic diagram of an exemplified network based video service system in accordance with the present invention.

Referring to FIG. 1, a network based video service system 100 includes a front-end server 110 which can function as a web server or an application server, a database 120 in connection with the front-end server 110, a data storage 130 in connection with the database 120 and configured to store video data, and a video processing engine 140 in connection with the database 120 and the data storage 130. The video processing engine 140 can be implemented, for example, by a computer processor or a computer server. The front-end server 110 can be connected to a client 170 via Internet 160, cloud storage such as Dropbox, and social sites such as Facebook. The client 170 can include a computer device running a web browser application such as HTML5.

The database 120 can store feature vectors in association with a person, a location, key objects, actions or a social event. For example, the feature vectors stored in the database 120 can relate to image features of a particular person's face, hair, body, clothes, and a person's images at different ages, which are also stored as metadata in the database 120. The feature vectors are generated by feature descriptors. A feature descriptor can be associated with one or multiple feature vectors. In some embodiments, three different feature descriptors can be used to perform highly accurate recognition. Each of the three feature descriptors generates its own feature vectors. The video processing engine 140 can automatically generate video summaries for the videos stored in the data storage 130 using information stored in the database 120.

Figure 2:
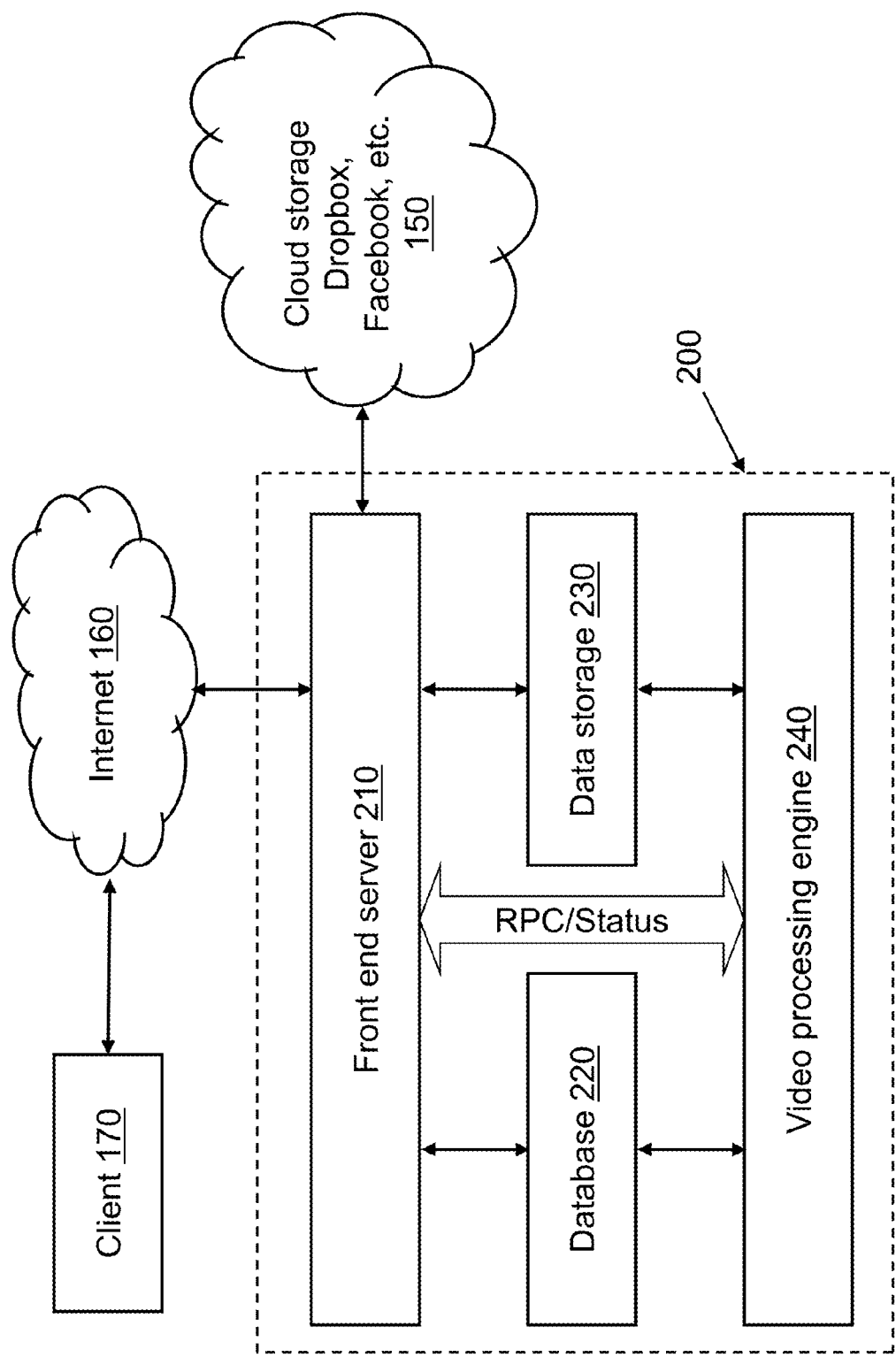
FIG. 2 is a schematic diagram of another exemplified network based video service system in accordance with the present invention.

In some embodiments, referring to FIG. 2, a network based video service system 200 includes a front-end server 210, a database 220, a data storage 230, and a video processing engine 240 similar to the video service system 100. The data storage 230, however, is configured to directly communicate with the front-end server 210 as well as the video processing engine 240. In addition, the front-end server 210 and the video processing engine 240 can directly communicate to exchange information such as making RPC and status calls.

Figure 3:
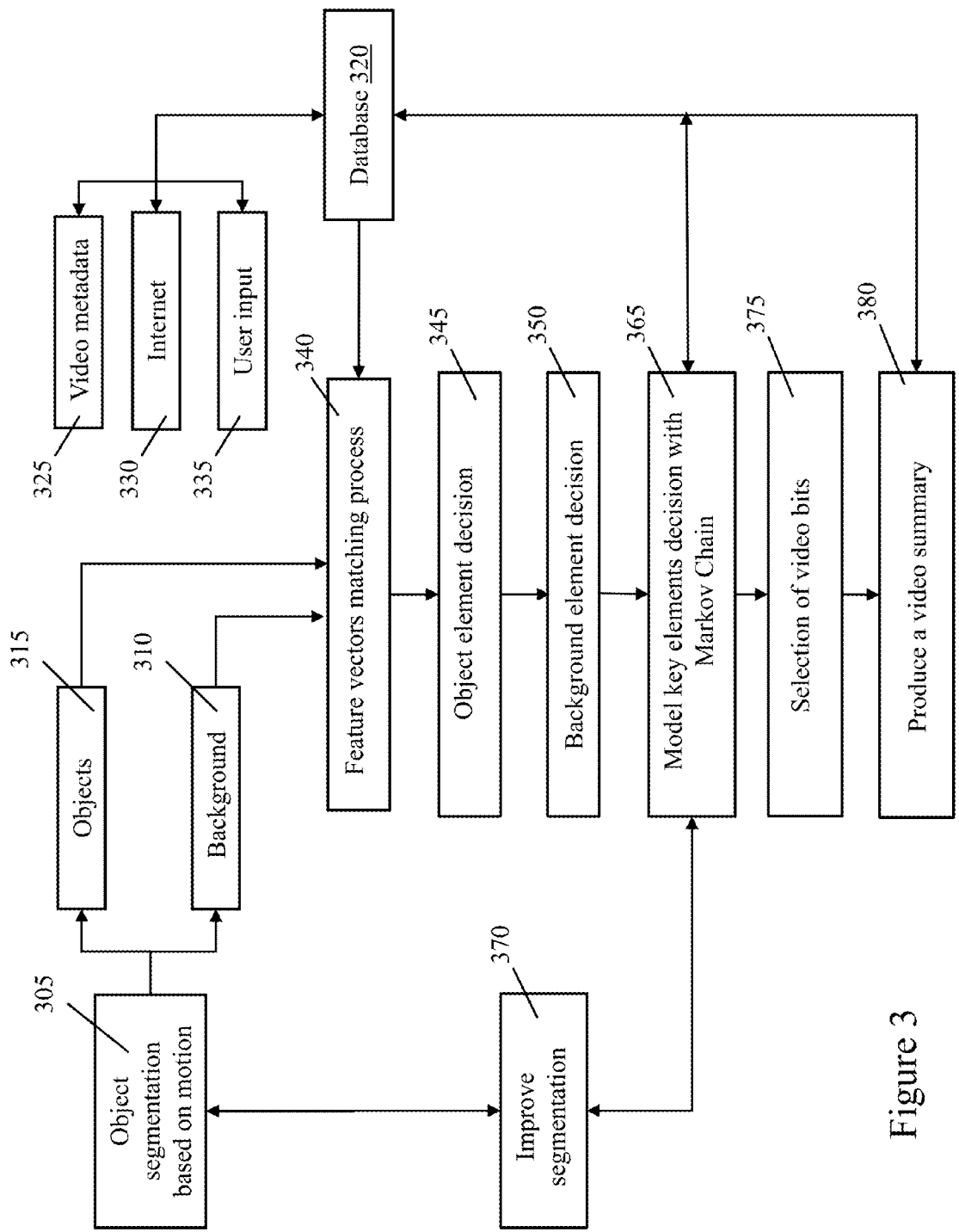
FIG. 3 is a flowchart for generating a video summary for an original video in accordance with the present invention.

Referring to FIG. 3, the process of generating a video summary for one or more videos can include the following steps. First, objects that undergo the same the movements in the video frames in an original video stored in the data storage (130, 230 in FIGS. 1 and 2) are identified and segmented (step 305). The backgrounds in the video frames are extracted (step 310). The objects are extracted by motion segmentation relative from the backgrounds (step 315). From the object and the background, the video processing engine (140, 240 in FIGS. 1, 2) extracts feature vectors using more than two different features descriptors. For example, three different features descriptors can be used to complement each other. For each descriptor, the feature vectors in the database 320 associated with the feature descriptor are searched (step 320) to find ones that potentially match the feature vectors extracted from the object and the background in the original video (step 340). The threshold for positive matching can be modulated by combining the results of the two or more feature descriptors. As an example, if the matching results of the three feature descriptors are all above 75%, it can be considered a positive match. If matching for one feature descriptor is below 75%, but is above 80% for the other feature descriptors, it can also be considered a positive match. In an additional example, if matching results for two feature descriptors are below 75% but one above 90%, it can also be considered a positive match. The matching threshold can also be modulated by the metadata. For example, if the feature vectors from the database are from a historic video recorded by the same owner at the same location as the currently analyzed video, the feature vectors are very likely to be the same so the threshold can be reduced for a positive match to compensate for the noise in the currently analyzed video.

The feature vectors of each identified object may be found to match with some feature vectors in the database (step 345). The background feature vectors may be found to match with some other feature vectors in the database (step 350).

Figure 4:
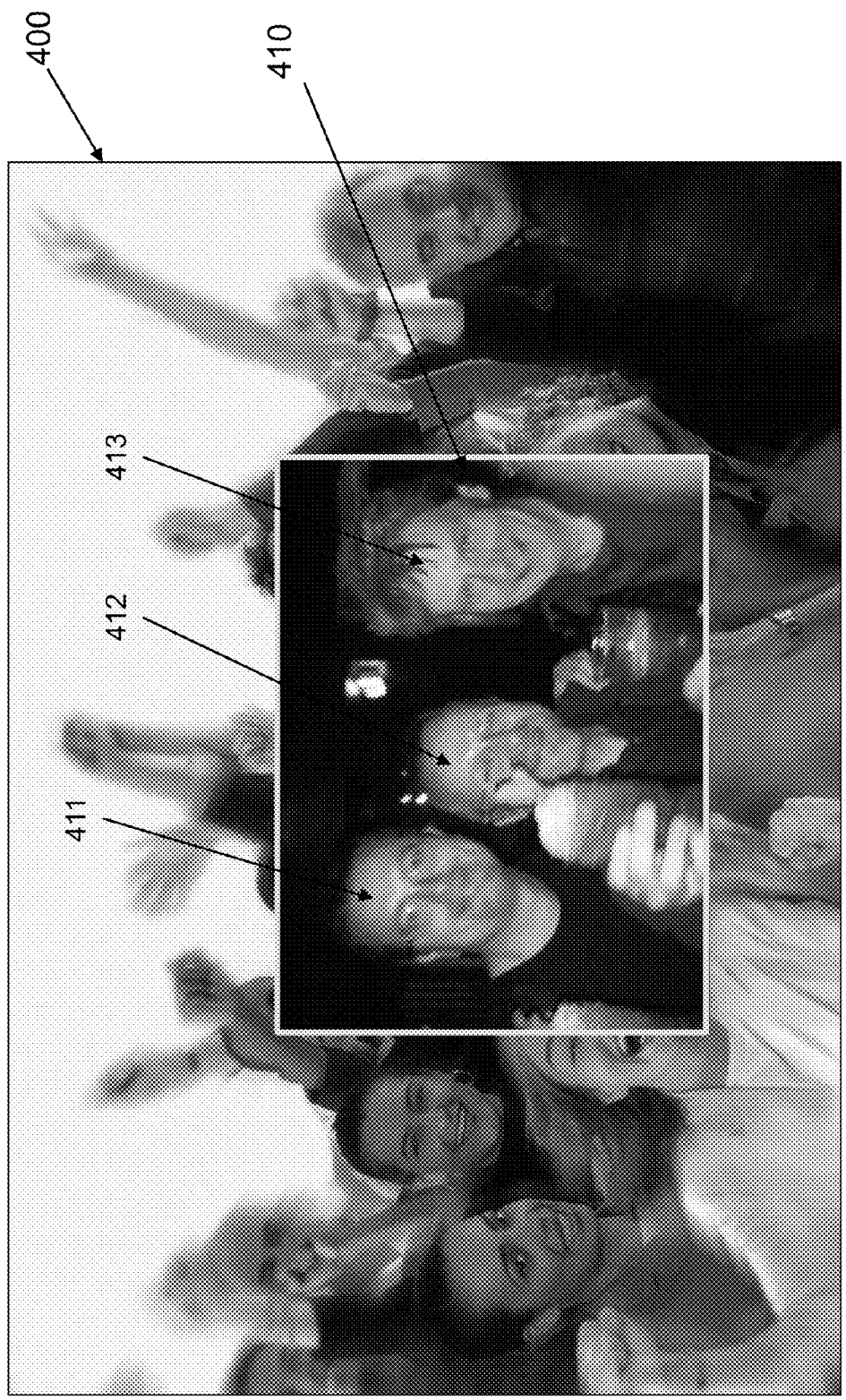
FIG. 4 shows the extraction of key elements from a video frame of an original video.

FIG. 4 shows a video frame 400 in an original video. Several objects 411-413 are detected to match feature vectors in the database. The objects 411-413 can be segmented from the background and extracted to be part of a video bit. Thus a video frame 410 of the video bit is formed by a subset of pixels of the corresponding video frame 400 in the original video. As time moves on, successive video frames 410 in the video bit can follow the key element (objects 411-413) and dynamically change positions in the video frame 400 of the original video. The video frame 410 in the video bit can have the same image resolution as the original video to provide high image quality to the viewers. Furthermore, the video frame 410 can have shapes other than a rectangular shape as in the original video frame 400, which includes round, oval, triangular, or irregular shapes) as shown in FIG. 5C).

The metadata associated with the original video can be used to compare with the metadata of the feature vectors storage in the database to improve the matching process of feature vectors, which can reduce or eliminate the impact of noise in the original video (e.g. camera motion, lack of focus, or long distance to key objects). Video metadata can be pre-stored or obtained in the video analysis process (step 325). Examples of video metadata include geo-location, timestamp or video owner tags together with the social network (Facebook and Linkedin) information of the video owner, his/her social graph (who are family members, friends, co-workers, partners or friends from friends). Based on the metadata associated with the features vectors from the input video and the database, the video processing engine can automatically change the matching threshold between feature vectors, reducing the threshold when we are in a situation where the match is very likely and increasing when it is very unlikely. As an example, in someone's personal videos, it is more likely to find friends and family members of the video owner than a stranger to the video owner, which is especially true if the video was recorded at home.

In step 340, positive matches of feature vectors are searched for each specific feature descriptor, which can be performed for feature vectors of two, three or more different feature descriptors. A decision is then made about a particular video bit/object or background combining the results of all positive matches using all feature descriptors. The above described process can increases the reliability of the recognition process together with the use of metadata, user inputs, and strong learning feature vector process. The process decides about the information associated to a particular video object/element or background and it works as follow:

First, for each feature descriptor, all positive matches of feature vectors extracted from the original video and those in the database are combined together with metadata information. Examples of questions asked can include: is the video record in the same location? Is the same owner? Is the video record very close in time to the one that database feature vectors where extracted? Are the positive matches family members? Friends? Partners? Key objects associated to the video owner or her or his social graph?

This process is repeated for all feature vectors in each feature descriptor. Then the results for all simple elements are combined to decide the tagging information about each single and simple element (location, people and key objects).

Once the decision of single and simple elements is made, the decision is extrapolated and shared to all features vectors that didn't produce a positive match with the database. These feature vectors can then be stored in the database with their newly obtained associated information (about a person, an occasion, an event, an action, or a location, etc.), which increases the knowledge about this particular video object/ element or background in the database. The above described automatic learning process can accumulate knowledge in the database and improve probability to feature vector identification in future videos. The above described automatic learning process also increases the reliability of the complex recognition process.

Once the system has identified all single and simple elements such as background, location, people and key objects, they are the inputs of the next process to identify key actions and events of the particular video input. The process to identify action and events or complex scenes is modeled by Markov Chain (step 365). Also complex analysis of single and simple elements drives the process to combine single and simple elements into complex elements that will become key parts of video summary, video searching, video browsing and video sharing tools. Markov chain is then used to model object elements and the background elements, such as persons, key objects, background and locations to decide the most likely action or social events associated with these set of object elements and background elements. The key elements (e.g. a person, an occasion, an event, an action, or a location) related to the scene in the video frames is intelligently interpreted by the Markov chain model (step 365).

For example, an object element extracted from the video frames by motion segmentation in steps 305, 310 is found to match a set feature vectors that are associated to a soccer ball in the database in steps 340, 345. The background element obtained in step 315 is found to match a set of feature vectors associated with Barcelona Stadium in step 350. The model can predict that the event recorded in these associated video frames is a soccer game in Barcelona Stadium. Furthermore, the original video's capture time and location can also be used as input to the Markov chain model. If the video recording location is at Barcelona Stadium or if the recording time corresponds to a time for a soccer game (searchable on the Internet), there is a higher likelihood that the event is indeed a soccer game at Barcelona Stadium. The series of video frames in the original video that include the soccer ball and Barcelona Stadium are segmented to produce a short video bit about the soccer game event.

In another example, a video is recorded at home. The home is recognized as the location and an initial state in the Markov chain model. Different probabilities exist to find the video owner, his or her family members and friends, strangers, or no one else at home. The probability of finding specific key objects is defined by the previous state and used within the matching process of feature vectors versus data base as described above (step 340). The probabilities are modeled in transitions from the initial state to the second state, then to the next and so on until the final state (step 365). The results are used to improve segmentation of objects in the original video (step 370). If the probability of finding a key object is high, the matching threshold for object can be reduced in the object segmentation (step 305). If the probability of finding a key object is low, the matching threshold for object can be increased in the object segmentation (step 305).

Using the example of home as an initial state, different probabilities are used to modulate the matching threshold for each feature vector finding the two sons of the video owner plus some of their friends and other family members (step 340). In state transition, there is a high probability to find elements of a celebration or party such as presents, toys, candles, celebration cakes, tables, foods, drink, and so on. The video processing engine detects a cake with candles in a table close to the 2 sons and their friends. The most likely final step is that this video is about a birthday celebration. The video processing engine joins the key elements associated with each son and the birthday cake when they are in the same original frame to form a video bit. The video processing engine then includes as many of their friends and family members as party guests as possible.

Once there is a clear decision on single and simple elements, there is a feedback to improve segmentation 370 to improve the quality of space and time segmentation of the video bits (step 305) by knowing what they are and having more accurate information of how they move by tracking the movement of the feature vector associated rather than color segmentation as initially performed.

The video bits are selected according to the output of the Markov chain model (step 375). The frequency of each of the key elements that appears in the original video is used as an input also in the selection of video bits for the video summary (step 375). Audio information is extracted from the original video(s) and embedded in the corresponding video frames in the video bits. The video bits select together can provide a summary for the original video(s) (step 380).

In some embodiments, two or more object elements can be extracted from the input video (step 315). For example, a soccer ball and a soccer jersey can be extracted as two separate key object elements, due to positive matched to a set of feature vectors stored in the database, and then modeled by Markov chain. The identification of both a soccer ball and a soccer jersey can be used by the model as evidence for a formal soccer game instead of a casual soccer practice (step 365).

In addition, the image portions comprising the object elements in the video frames can be extracted to form the video frames in the short video bits. Thus the video frames can be smaller than those of the original video while having the same image resolution. The video frames of the short video bits do not have to be rectangular in shape; they can be round, oval, and the most likely following the border of the object or objects that is or are inside of each video bit what define their irregular shapes so that objects identified are highlighted while discarding uninteresting objects. This is a significant optimization of video summary in "space" because only relevant area of a video frame is presented and irrelevant portions are removed. The spatial reduction also reduces the data size in the video bits in the video summary, which reduces bandwidth cost for video sharing, and increases the efficiency of video summary by focusing user's attention on the key elements.

An important aspect of the present invention is the capability of learning (relevant person, location, objects, actions and the social events) for unknown background and object elements. If a match is not found for the object or background elements in the database in step 340, the unrecognized elements and their associated featured vectors are stored in the database 320. The disclosed video processing engine can learn and understand information about a person, a location, objects, background, actions or a social event related to these object and background elements at the time of video summary production or afterwards. For example, the video processing engine may access, with users' approval, uses' storage to obtain video metadata about unrecognized elements (step 325). The video processing engine can also search similar images over the internet to find text description about these similar images on the web (step 330), which may provide clues to what the unrecognized elements are about. The video processing engine can also ask a user to help describe the event or the person, location related to the unrecognized elements (step 335). In sum, the number of feature vectors and knowledge about them can be accumulated over time. When a mass number (e.g. 100 million) of videos from a large number (e.g. millions) of users are analyzed by the video processing engine, the training can be very efficient and accuracy for event understanding can be increased rapidly.

For example, a video recorded the scenes when the first time a boy rides a bike. Images of the boy's face and body may not have been stored as feature vectors in the database. Feature vectors for the bike have been stored in the database, which enable the bike in the original video to be recognized by the video processing engine (140, 240 in FIGS. 1 and 2), as described above. Once the boy's image is found in the user's local storage in association with the boy's name or the boy's name is given by a user, the event for the video recording can be interpreted and recognized as the boy riding a bike. If this is the first know bike riding event for the boy and if it is further learned that the boy has a young age, there is a high likelihood that this video recording is about the boy's first biking experience.

Figure 5B:
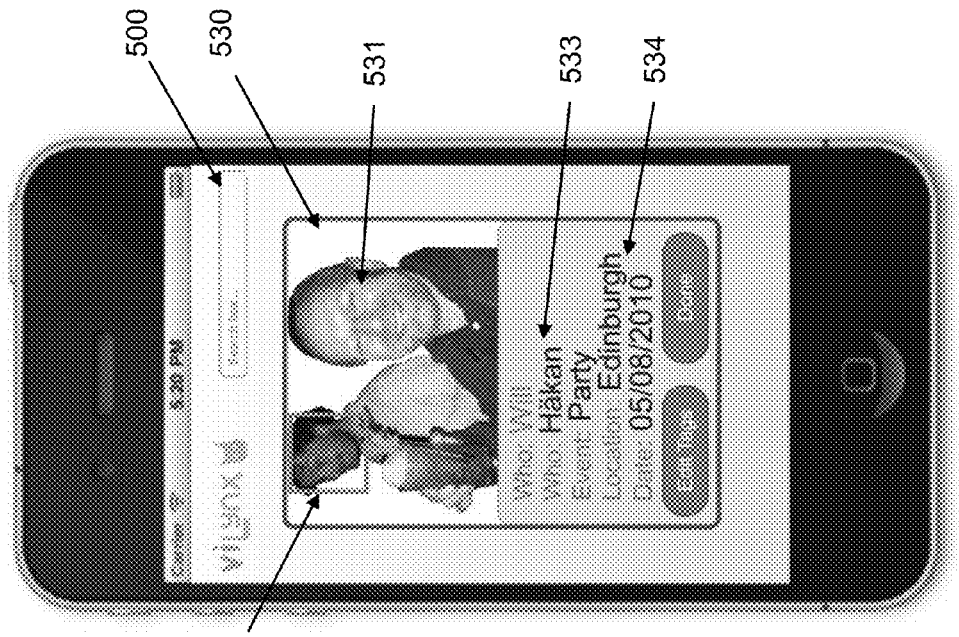
FIG. 5A-5C illustrates a user interface configured to display and play video bits as a summary for one or more original videos.
Figure 5A:
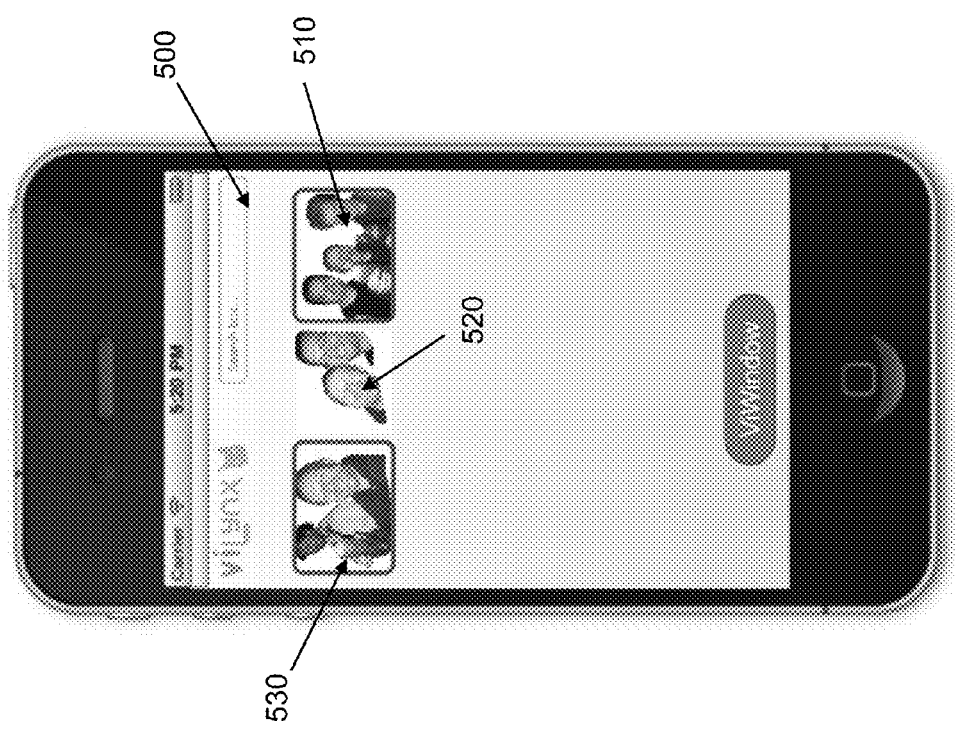
Figure 5C:
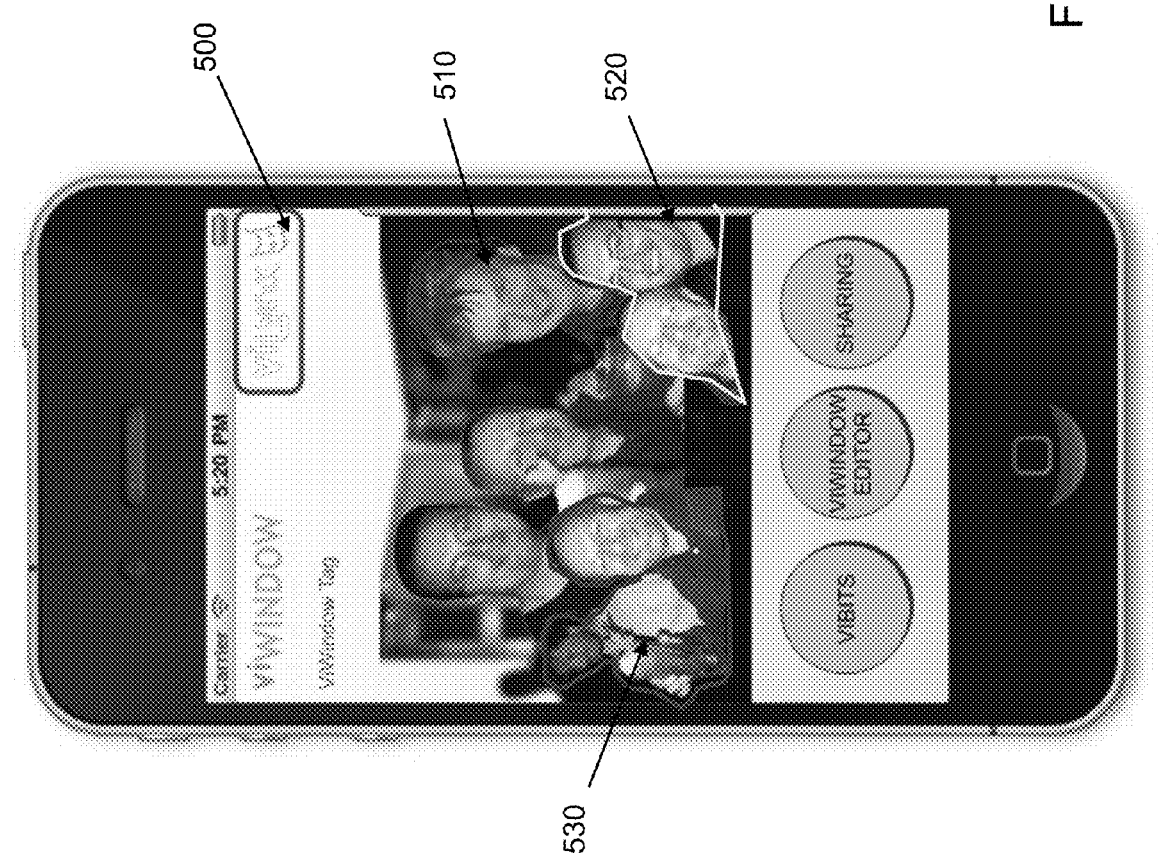

FIGS. 5A-5C illustrates a user interface 500 configured to play plurality of video bits in a summary for one or more original videos. Video bits 510-530 produced by steps in FIG. 3 can be automatically displayed in the user interface 500. FIG. 5A shows that the video bits 510-530 provide a summary of video(s) recorded at a party by one or more friends who attended the party. The video bits can have video frames that are only a portion, that is, smaller than, the frames of the original video (as shown in FIG. 4). In other words, the video bits focus on the objects of interest, in this case, faces of friends who attended the party. The image resolution of the video bits can be the same as the image resolution of the original video to keep high image quality. The video bits can have irregular shaped frames that are not rectangular to exclude objects of less interest. The video frames of the short video bits 510-530 can overlap with each other in time, or position in the video frames of the original video(s).

Referring to FIG. 5B, the video processing engine can automatically detect and recognize faces 531, 532 in a video bit 530, and provide names to the people whose faces are recognized. The user interface 500 allows user to input location, time for the recording of the original video, which can be used as tags for the original video and the video bits 530 and video bits 510, 520. It is shown that at least one video frame in the video bit 530 has an irregular frame shape other than a rectangle. As time moves on, two video frames in the video bit 530 can vary in shape, and have different numbers of pixels.

As shown in FIG. 5C, two, three, or all the video bits 510-530 can be played simultaneously to allow rapid browsing in the same user interface 500 (boundary lines are added to video bits 520, 530 to guide the eyes). Each of the video bits 510-530 can also be individually played. The video bits 510-530 can be played in a window in the user interface. The video bits 510-530 can be displayed overlapping in time or overlapping in locations in the user interface 500. The overlapping pixels in the video bits 510-530 played simultaneously in the user interface can be transparent to each other. The overlapping pixels in the video bits 510-530 played simultaneously in the user interface can semi-transparent or opaque to each other.

In some embodiments, the user interface 500 can receive a search command having a criterion related to the key event. The disclosed method can find one or more video bits in video summary that match the criterion, and automatically presents is the one or more video bits in the user interface 500.

The user interface 500 can receiving a remark from a user about at least one of the video bits in the user interface. The remark can be stored in the data storage (130, 230 in FIGS. 1, 2) in association with the one of the video bits. The remark can determine the importance and the weight of the one of the video bits.

Furthermore, weights can be stored in association with the video bits the data storage (130, 230 in FIGS. 1, 2). A video bit can be zoomed in the user interface 500 if it has a high weight to allow the viewers to see details of the more important video bits. The weights for the video bits can be based on user input. The weights of the video bits can be determined automatically based on the types of key elements or the frequency of appearance of the key elements in the original video. The weights for the plurality of video bits can be determined by people's relationship in the key elements in the plurality of video bits.

In some embodiments, the video processing engine 140, 240 can assign weights to video bits (or vibits), or assign weights to the object element and/or the background element detected in the input video, with higher weights indicating more relevance to the key event, based on statistical information such as how often each element appears on the video, the metadata and the social graph associated to each person involved in the element and associated to the user (family, friends, partners, others . . . ). The disclosed method provide a user interface that allows automatically zooming of the video bits based on the weights of the first element and the second element or the weights of the video bits. Detailed views of the video bits can thus be presented in the user interface 500 to viewers.

In some embodiments, the user interface can receive a remark from a user about at the video bits. The remarks can be stored in the database in association with the video bits. The remarks can determine the importance and the weight of the one of the video bits.

It should be noted that video bits 510-530 can be played as real video clips with audio and motion, which is different from come technologies that use slideshow of static pictures in video summaries.

Figure 6:
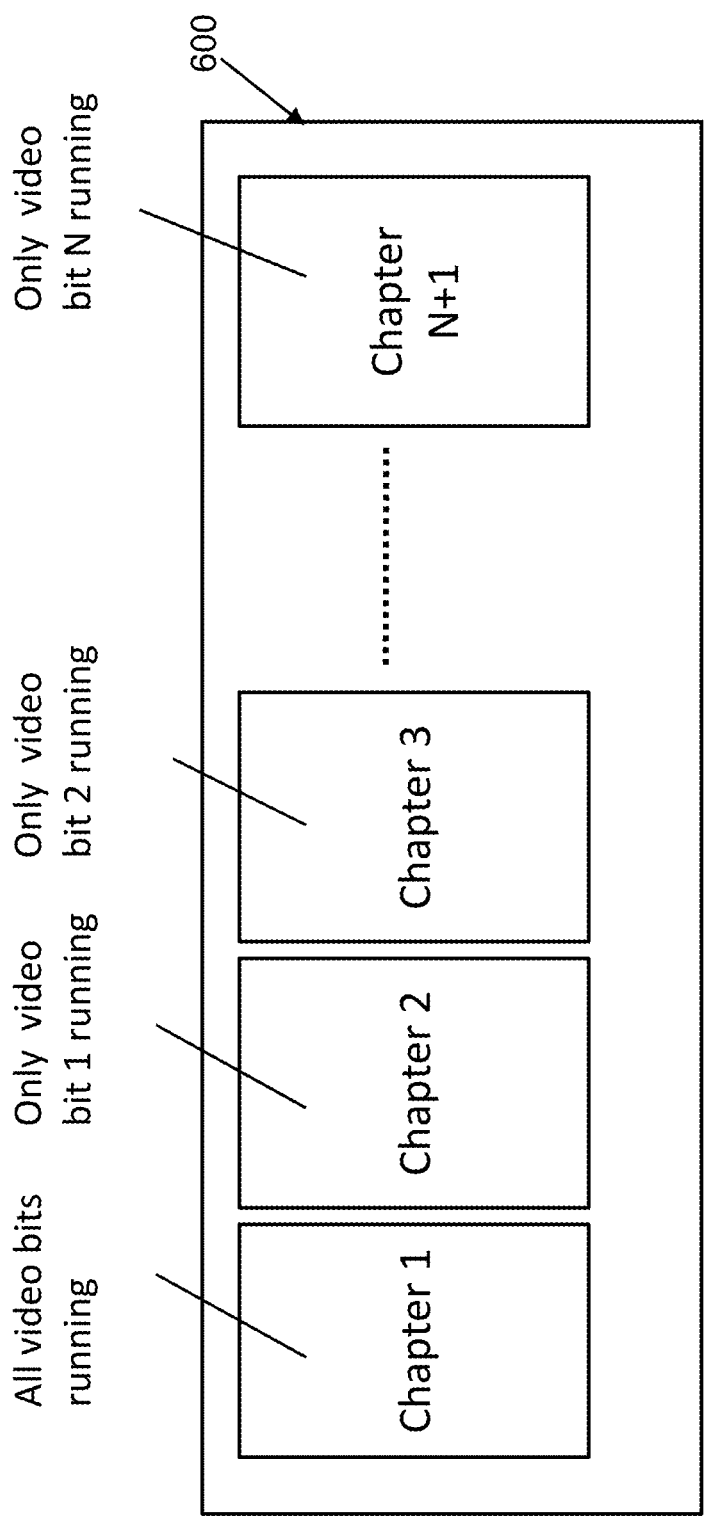
FIGS. 6-8 are schematic diagrams showing the arrangements of video bits in a video player in accordance with an embodiment of the present invention.

FIG. 6 is a schematic diagram showing the arrangement of video bits in a video player 600 that can be based on a standard codec protocol such as MPEG-4. The original videos can be produced by one or more users. The video player 600 can be loaded with N video bits for one or more original videos. Chapter 1 is used to all the video bits to run simultaneously. Chapters 2 to N+1 are each used for running one of the N video bits separately. In a user interface (e.g. 500 in FIGS. 5A-5C), a user can select one of the video bits to play that short video bit, or play all video bits simultaneously. The video bits are played at different locations of the user interface, but can have overlapping pixels with each other. The overlapping portion can have transparent, semi-transparent, or opaque pixels.

Figure 7:
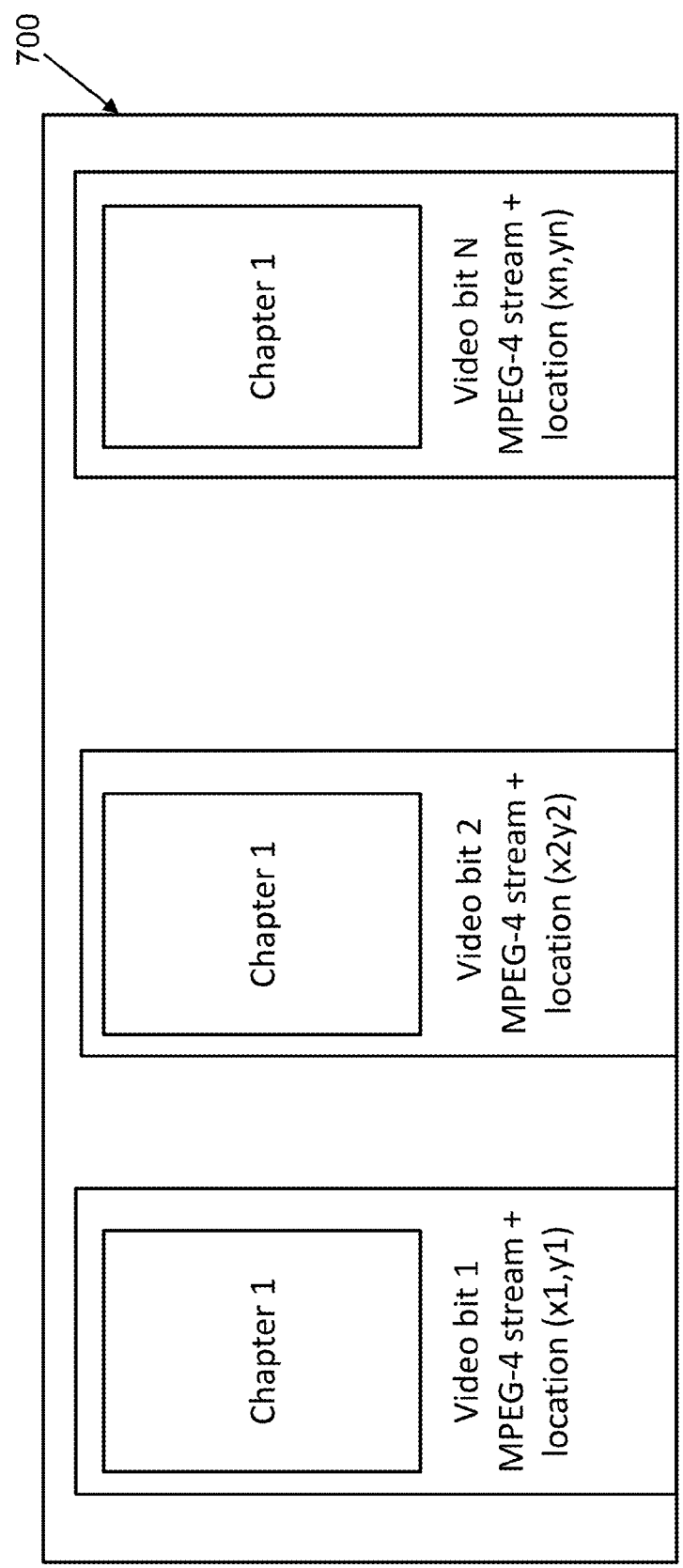

FIG. 7 is a schematic diagram showing the arrangement of video bits in a video player 700. Each video bit is fed as an independent video stream with a specified location at the user interface. The location specifies the location that the video stream is to be played at the user interface, for example, the location within a window. For example, video bit 1 is to be played at (x1, y1); video bit 2 at (x2, y2); video bit N at (xn, yn), etc. Again, the video bits can have overlapping pixels with each other. The overlapping portion can have transparent, semi-transparent, or opaque pixels.

Figure 8:
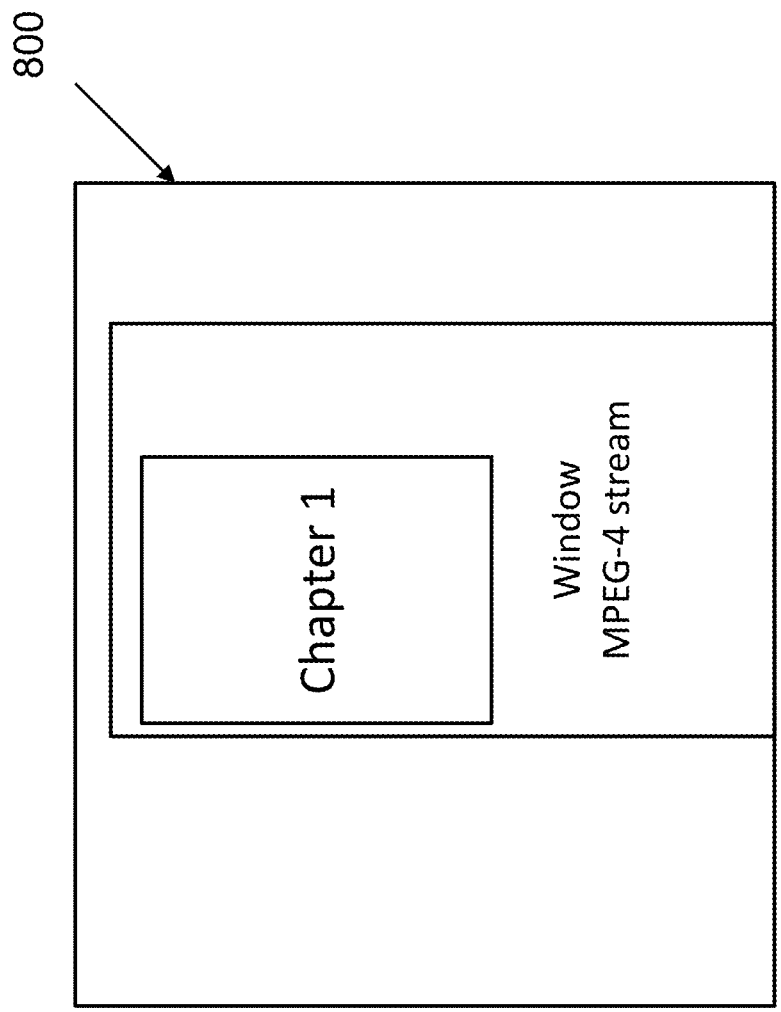

In some embodiments, referring to FIG. 8, a user can select a video bit to play at a user interface (e.g. 500, FIGS. 5A-5C) by a video player 800. The video bit is fed as a video stream in a single chapter from a server over the computer network to the user interface. The video stream can be in a standard format such as MPEG-4.

It is understood that the disclosed systems and methods are compatible with other configurations and processes without deviating from the present invention. For example, the presently disclosed methods are compatible with other arrangements on how short video bits can be played by video players. Moreover, the disclosed video players can be compatible with different video compression/decompression standards such as H.263, MPEG1, MPEG2, MPEG4, H.264, VC-1, and AVS (China standard), as well as proprietary compression/decompression standards such as WMV, RealVideo, DIVX, and XVID. Furthermore, presently disclosed methods can be implemented in the network configurations other than the examples disclosed above. The various tasks can be performed by additional computer devices or be integrated into fewer computer devices. Moreover, metadata for feature vectors in the database or the input video can be obtained by other methods than the examples above.

What is claimed is:

1. A computer-assisted method for producing a space time summary for one or more original videos, comprising:
   automatically recognizing a key element in an original video by a computer processor, wherein the original video comprises a series of video frames, wherein the key element occupies of a portion of at least one of the video frames in the original video, wherein the step of automatically recognizing a key element in an original video comprises:
      selecting a complex element comprising at least two elements from an original video;
      segmenting the complex element from the original video;
      extracting data feature vectors from the at least two elements by the computer processor;
      matching the data feature vectors to reference feature vectors that are associated with a common feature descriptor; and
   automatically recognizing at least one of the two elements as the key element;
   extracting pixels from the portions related to the key element in the series of video frames of the original video, wherein the step of extracting pixels from the portions includes extracting the complex element from the original video to form part of the video bit, wherein the portion of the video frames related to the key element dynamically change positions in the video frames of the original video;
   producing a video bit comprising a series of video frames comprising the pixels and audio information extracted from the original video, wherein at least one video frame of the video bit is formed by a subset of pixels of the corresponding video frame in the original video;
   automatically displaying a plurality of video bits in a user interface, wherein the plurality of video bits are extracted from one or more original videos, and provide a space time summary for the one or more original videos; and
   allowing at least two of the plurality of video bits to be played simultaneously with audio and in motion in the user interface.

2. The computer-assisted method of claim 1, wherein the video frames of the video bit follow the key element and dynamically change positions in the video frames of the original video.

3. The computer-assisted method of claim 1, wherein at least two video frames in the video bit have different shapes.

4. The computer-assisted method of claim 1, wherein at least two video frames in the video bit have different numbers of pixels.

5. The computer-assisted method of claim 1, wherein at least one video frame in the video bit has an irregular frame shape other than a rectangle.

6. The computer-assisted method of claim 1, wherein two video bits in the user interface overlap in time or overlap in locations in the video frames of the original video.

7. The computer-assisted method of claim 6, wherein the two video bits played simultaneously in the user interface have an overlapping location, wherein the pixels of the two video bits in the overlapping location are transparent to each other.

8. The computer-assisted method of claim 6, wherein the two video bits played simultaneously in the user interface have an overlapping location, wherein at least some of the pixels of the two video bits in the overlapping location are semi-transparent or opaque to each other.

9. The computer-assisted method of claim 1, wherein the key element comprises a person, an occasion, an event, an action, or a location.

10. The computer-assisted method of claim 1, wherein the step of automatically recognizing a key element in an original video comprises:
    receiving a search; and automatically detecting the key element in one or more original videos in response to the search.

11. The computer-assisted method of claim 1, further comprising:
   receiving a search; and
   automatically detecting a video bit in response to the search.

12. The computer-assisted method of claim 1, wherein the one or more original videos summarized by the plurality of video bits in the user interface were recorded by two or more users.

13. The computer-assisted method of claim 1, further comprising:
   storing weights in association with the plurality of video bits; and
   allowing one of the video bits to be zoomed in the user interface according to the weight of the one of the video bits.

14. The computer-assisted method of claim 13, wherein the weights for the plurality of video bits are determined by a user.

15. The computer-assisted method of claim 13, wherein the weights for the plurality of video bits are determined automatically based on the types of key elements or the frequency of appearance of the key elements in the original video.

16. The computer-assisted method of claim 13, wherein the weights for the plurality of video bits are determined by people's relationship in the key elements in the plurality of video bits.

17. The computer-assisted method of claim 1, further comprising:
   receiving a remark from a user about at least one of the video bits in the user interface; and
   storing the remark in association with the one of the video bits.

18. The computer-assisted method of claim 17, wherein the remark determines the importance and the weight of the one of the video bits.

19. The computer-assisted method of claim 1, further comprising:
   allowing one of the video bits to be played by itself in the user interface.

20. The computer-assisted method of claim 1, wherein the two video bits are played simultaneously in a same window in the user interface.

21. A computer-assisted method for producing a space time summary for original videos, comprising:
   automatically recognizing a key element in an original video by a computer processor, wherein the original video comprises a series of video frames, wherein the key element occupies of a portion of at least one of the video frames in the original video, wherein the step of automatically recognizing a key element in an original video comprises:
      selecting a complex element comprising at least two elements from an original video;
      segmenting the complex element from the original video;
      extracting data feature vectors from the at least two elements by the computer processor;
      matching the data feature vectors to reference feature vectors that are associated with a common feature descriptor; and
      automatically recognizing at least one of the two elements as the key element;
   extracting pixels from the portions related to the key element in the series of video frames of the original video, wherein the step of extracting pixels from the portions includes extracting the complex element from the original video to form part of the video bit, wherein the portion of the video frames related to the key element dynamically change positions in the video frames of the original video;
   producing a video bit comprising a series of video frames comprising the pixels and audio information extracted from the original video, wherein the video frames of the video bit follow the key element and dynamically change positions in the video frames of the original video, wherein at least one video frame of the video bit is formed by a subset of pixels of the corresponding video frame in the original video; and
   allowing the video bit to be played at a user interface with audio and motion to provide a space time summary for the original video.

22. The computer-assisted method of claim 21, wherein at least two video frames in the video bit have different shapes or different numbers of pixels.

23. The computer-assisted method of claim 21, wherein at least one video frame in the video bit has an irregular frame shape other than a rectangle.

24. The computer-assisted method of claim 21, wherein the key element comprises a person, an occasion, an event, an action, or a location.

25. The computer-assisted method of claim 21, wherein the step of automatically recognizing a key element in an original video comprises:
   receiving a search; and
   automatically detecting the key element in one or more original videos in response to the search.

26. The computer-assisted method of claim 21, further comprising:
   receiving a search; and
   automatically detecting a video bit in response to the search.

27. The computer-assisted method of claim 21, wherein the one or more original videos summarized by the plurality of video bits in the user interface were recorded by two or more users.

28. The computer-assisted method of claim 21, further comprising:
   receiving a remark from a user about at least one of the video bits in the user interface; and
   storing the remark in association with the one of the video bits.

29. The computer-assisted method of claim 28, wherein the remark determines the importance and the weight of the one of the video bits.

30. The computer-assisted method of claim 21, wherein the two video bits are played simultaneously in a same window in the user interface.

31. The computer-assisted method of claim 1, wherein the step of automatically recognizing a key element in an original video comprises:
   storing, in a database, reference feature vectors each associated with a feature descriptor;
   selecting at least two elements from an original video;
   extracting data feature vectors from the at least two elements by the computer processor;
   matching the data feature vectors to the reference feature vectors that are associated with a common feature descriptor; and
   if a positive matching is obtained, automatically recognizing at least one of the two elements as the key element based the feature descriptor associated with the reference feature vectors stored in the database.

32. The computer-assisted method of claim 31, wherein a first one of the two elements relates to an object, wherein a second one of the two elements relates to a background, wherein the step of automatically recognizing a key element in an original video comprises:
  extracting the background in the original video; and
  extracting the first element from the background in the original video by motion segmentation, wherein the object and the background are both associated with the common feature descriptor in the database.

33. The computer-assisted method of claim 21, wherein the step of automatically recognizing a key element in an original video comprises:
  storing, in a database, the reference feature vectors each associated with a feature descriptor; and
  if a positive matching is obtained, automatically recognizing at least one of the two elements as the key element based the feature descriptor associated with the reference feature vectors stored in the database.

34. The computer-assisted method of claim 33, wherein a first one of the two elements relates to an object, wherein a second one of the two elements relates to a background, wherein the step of automatically recognizing a key element in an original video comprises:
  extracting the background in the original video; and
  extracting the first element from the background in the original video by motion segmentation, wherein the object and the background are both associated with the common feature descriptor in the database.

* * * * *